United States Patent
Reial et al.

(10) Patent No.: US 9,942,009 B2
(45) Date of Patent: Apr. 10, 2018

(54) MEASUREMENT GAP CONFIGURATION

(71) Applicant: Telefonaktiebolaget L M Ericsson (publ), Stockholm (SE)

(72) Inventors: Andres Reial, Malmo (SE); Peter Alriksson, Horby (SE); Bengt Lindoff, Bjarred (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/437,965

(22) PCT Filed: Apr. 8, 2015

(86) PCT No.: PCT/EP2015/057590
§ 371 (c)(1),
(2) Date: Apr. 23, 2015

(87) PCT Pub. No.: WO2016/162057
PCT Pub. Date: Oct. 13, 2016

(65) Prior Publication Data
US 2017/0048027 A1    Feb. 16, 2017

(51) Int. Cl.
*H04L 1/18* (2006.01)
*H04W 16/14* (2009.01)
(Continued)

(52) U.S. Cl.
CPC .......... *H04L 1/1896* (2013.01); *H04L 1/1864* (2013.01); *H04W 48/12* (2013.01);
(Continued)

(58) Field of Classification Search
CPC .... H04L 1/1825; H04L 1/1896; H04W 4/005; H04W 48/08; H04W 48/12;
(Continued)

(56) References Cited

U.S. PATENT DOCUMENTS 8,358,629 B2 * 1/2013 Grilli ............... H04W 36/0088
                                                    370/331
8,374,108 B2 * 2/2013 Nakashima ....... H04W 36/0088
                                                    370/310
(Continued)

FOREIGN PATENT DOCUMENTS

CN   WO 2015018025 A1 * 2/2015 ............ H04W 24/10
FI   WO 2013104129 A1 * 7/2013 ............ H04W 16/14
(Continued)

OTHER PUBLICATIONS

3GPP TS 36.133 Version 12.6.0 "Evolved Universal Terrestrial Access (E-UTRA); Requirements for support of radio resource management (Release 12)" Dec. 2014, Section 8.1, pp. 1-32 and 84-154.
(Continued)

*Primary Examiner* — Alpus H Hsu
(74) *Attorney, Agent, or Firm* — Leffler Intellectual Property Law, PLLC

(57) ABSTRACT

A method a wireless communication device and a corresponding method for a network node of a cellular communication system are disclosed. The network node and the wireless communication device are configured to communicate with each other according to an automatic repeat request (ARQ) protocol having a requirement that a number of time units between reception of an ARQ packet and transmission of an associated response message is smaller than a maximum response time. According to the methods, the wireless communication device transmits at least one measurement gap adaptation signal to the network node. The network node determines a measurement gap configuration of the wireless communication device based on the measurement gap adaptation signal, wherein measurement gaps of the measurement gap configuration have a length smaller than the maximum response time. The network node trans-
(Continued)

mits an indication of the measurement gap configuration to the wireless communication device, which uses the measurement gap configuration to perform measurements. Corresponding computer program product, arrangements, network node and wireless communication device are also disclosed.

45 Claims, 4 Drawing Sheets

(51) Int. Cl.
    *H04W 48/12*     (2009.01)
    *H04W 56/00*     (2009.01)
    *H04W 88/02*     (2009.01)
    *H04W 88/08*     (2009.01)
    *H04W 48/16*     (2009.01)
    *H04W 4/00*     (2018.01)

(52) U.S. Cl.
    CPC .......... *H04W 56/001* (2013.01); *H04W 4/005* (2013.01); *H04W 48/16* (2013.01); *H04W 56/0065* (2013.01)

(58) Field of Classification Search
    CPC .......... H04W 56/001; H04W 56/0055; H04W 56/0065; H04W 80/00
    See application file for complete search history.

(56) References Cited

U.S. PATENT DOCUMENTS

| | | | | |
|---|---|---|---|---|
| 8,929,347 | B2* | 1/2015 | Dalsgaard | H04L 5/0044 370/328 |
| 2008/0189970 | A1* | 8/2008 | Wang | H04W 36/0055 33/701 |
| 2012/0264449 | A1* | 10/2012 | Kazmi | G01S 5/0205 455/456.1 |
| 2013/0059610 | A1* | 3/2013 | Siomina | H04W 24/10 455/456.6 |
| 2014/0146742 | A1* | 5/2014 | Khandekar | H04B 1/7073 370/328 |
| 2015/0201338 | A1* | 7/2015 | Gopal | H04W 36/0088 370/252 |

FOREIGN PATENT DOCUMENTS

| | | |
|---|---|---|
| WO | 2013104129 A1 | 7/2013 |
| WO | 2015018025 A1 | 2/2015 |
| WO | 2015023222 A1 | 2/2015 |

OTHER PUBLICATIONS

3GPP TS 36.231 Version 12.4.0 "Evolved Universal Terrestrial Radio Access (E-UTRA); Medium Access Control (MAC) protocol specification (Release 12)" Dec. 2014, Section 5.4, pp. 1-60.
3GPP TS 25.211 Version 10.0.0 "Physical Channels and mapping of transport channels onto physical channels (FDD) (Release 10)" Sep. 2010, Section 5.3.3.5, pp. 1-58.
3GPP TS 25.213 Version 10.0.0 "Spreading and modulation (FDD) (Release 10)" Sep. 2010, Section 5.2.3.2, pp. 1-39.
PCT International Search Report, dated Dec. 16, 2015, in connection with International Application No. PCT/EP2015/057590, all pages.
PCT Written Opinion, dated Dec. 16, 2015, in connection with International Application No. PCT/EP2015/057590, all pages.
3GPP TSG RAN Meeting #67, RP-150515, Shanghai, China, Mar. 9-12, 2015, Intel Corporation, New SI proposal: Measurement gap enhancement, 8 pages.
3GPP TS 36.133 V12.6.0 Section 8.1, 2014-12, Release 12, pp. 455-473.
3GPP TS 36.211 V12.4.0 2014-12, 3rd Generation Partnership Project; Technical Specification Group Radio Access Network; Evolved universal Terrestrial Radio Access (E-UTRA); Physical channels and modulation, Release 12, pp. 1-17.

* cited by examiner

MEASUREMENT GAP CONFIGURATION

TECHNICAL FIELD

The present invention relates generally to the field of performing measurements in a cellular communication system. More particularly, it relates to configuration of measurement gaps for performing such measurements.

BACKGROUND

Some applications and services provided via use of a cellular communication network may be simultaneously subject to low latency requirements and high reliability (robustness) requirements.

An example of such applications and services may be illustrated in terms of mission critical MTC (machine type communication) devices (hereinafter also termed C-MTC devices).

Mission critical MTC devices are used for communication e.g. in relation to manufacturing, process industry, automotive, and medical applications. Mission critical MTC devices require higher reliability and lower latency than previously supported in legacy communication systems (e.g. communication systems operating according to standards advocated by the Third Generation Partnership Project—3GPP—of the second generation—2G (e.g. GSM—Global System for Mobile communication), third generation—3G (e.g. UMTS—Universal Mobile Telecommunication Standard), and fourth generation—4G up to Rel.12 (e.g. UMTS LTE—UMTS, Long Term Evolution)). These requirements may, for example, be needed in order to maintain robust control loop functions.

Typically, message delays over the wireless link need to be kept low as well as the round-trip time. Typical example requirements for C-MTC devices may include a maximum message delay of 20 ms and 0.001 ppm of the messages being allowed to violate the maximum message delay. In order to meet such latency requirements (for example in 4G), strict requirements may be put on the physical layer to not (or at least to a very small degree) introduce transport block errors since each retransmission adds to the message delay (e.g. 8 ms in a typical example for 4G).

In order to provide robust functionality (high reliability) the C-MTC device typically needs to support hand-over from a first set of carriers to a second set of carriers, should the second set of carriers be provided by one or more cells that can be received with higher signal power and/or lower interference than the cell(s) providing the first set of carriers. The two sets of carriers may or may not be partially overlapping, and each set of carriers may comprise one or more carriers. One or more carriers of the second set may apply a different radio access technology (RAT) than carriers of the first set. To support inter-RAT and/or inter-frequency hand-over, measurements (e.g. cell search, monitoring, power level estimation, etc.) need to be performed to determine the second set of carriers.

Therefore, there is a need for methods and arrangements that enable performing such measurements while not violation applicable low latency requirements.

An example of measurements that may need to be performed to provide high reliability is cell detection (sell search) measurements. Cell detection is typically carried out by detecting one or more synchronization signals transmitted by a network node according to a predefined pattern.

In many systems, the synchronization signals comprise a first (primary) synchronization signal and a second (secondary) synchronization signal. The first synchronization signal may typically exist in one or a few versions, essentially providing information about the existence of a cell. In a measurement procedure, the wireless communication device may typically search for this primary synchronization signal at all possible timings and, once detected, the wireless communication device knows where to look for the secondary synchronization signal, which may typically provide a cell identity (e.g., 2G: base station identity code (BSIC); 3G: scrambling code (SC); 4G: physical cell identity (PCI)) and possibly (depending on the radio access technology) further—explicit or implicit—information regarding frame timing, transmission modes, frame type, etc.

In 4G the synchronization signals comprise a Primary Synchronization Signal (PSS) and a Secondary Synchronization signal (SSS), in 3G FDD (frequency division duplex) the synchronization signals comprise a Primary Synchronization CHannel (PSCH) and a Secondary Synchronization CHannel (SSCH), and in 2G the synchronization signals comprise a Frequency Correction CHannel (FCCH) and a Synchronization CHannel (SCH).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

In this description, the term "ARQ packet" is used both for the first transmission and for retransmissions of a packet in accordance with an ARQ protocol.

It is an object of some embodiments to solve or mitigate at least some of the above or other disadvantages.

According to a first aspect, this is achieved by a method for a network node of a cellular communication system configured to communicate with a wireless communication device according to an automatic repeat request (ARQ) protocol. The ARQ protocol has a requirement that a number of time units between reception of an ARQ packet and transmission of an associated response message is smaller than a maximum response time.

The method comprises receiving at least one measurement gap adaptation signal from the wireless communication device, determining a measurement gap configuration of the wireless communication device based on the measurement gap adaptation signal, and transmitting an indication of the measurement gap configuration to the wireless communication device.

The measurement gap configuration is for performing measurements by the wireless communication device and the measurement gaps of the measurement gap configuration have a length smaller than the maximum response time.

According to some embodiments, the communication between the network node and the wireless communication device is in accordance with an OFDM (orthogonal frequency division multiplex) based radio access technology, e.g. a 4G system.

The time units may, for example, be subframes.

The ARQ protocol may, in some embodiments, be a hybrid automatic repeat request (HARQ) protocol.

The wireless communication device may, according to some embodiments be a mission critical machine type communication device (C-MTC) or another device with lower than ordinary latency requirements. In some embodiments, the wireless communication device may be adapted to operate in any of two modes; a low latency mode (where approaches according to some embodiments may be applicable) and an ordinary mode.

Performing measurements may, for example, comprise performing inter-RAT and/or inter frequency measurements. The measurements may include cell search and/or cell monitoring according to some embodiments.

According to some embodiments, the at least one measurement gap adaptation signal may comprise an indication of a capability of the wireless communication device to operate according to one or more measurement gap configurations with measurement gap lengths smaller than the maximum response time.

The determination of the measurement gap configuration may, for example, be in response to reception of the indication of the capability or may occur at a later point in time (e.g. in response to reception of a request as explained in the following).

According to some embodiments, the at least one measurement gap adaptation signal may, alternatively or additionally, comprise a request by the wireless communication device to be configured to operate according to one or more measurement gap configurations with measurement gap lengths smaller than the maximum response time.

The determination of the measurement gap configuration may, for example, be in response to reception of the request.

Apart from specifying a gap length, the measurement gap configuration may, in some embodiments, also specify a periodicity of the measurement gaps. The periodicity may, for example be defined as a time (or a number of time units) between a start of a measurement gap to a start of a subsequent measurement gap, or as a time (or a number of time units) between an end of a measurement gap to an end of a subsequent measurement gap, or in any other suitable manner.

Alternatively or additionally and apart from specifying a gap length, the measurement gap configuration may, in some embodiments, specify an offset to be applied in relation to a specified point in time.

The periodicity of the measurement gaps may, in some embodiments, be larger than a maximum time between transmission of the ARQ packet and reception of the associated response message.

According to some embodiments, a number of time units equaling the periodicity of the measurement gaps may differ from a multiple of a number of time units between occurrences of synchronization signal transmissions of the cellular communication system. The synchronization signal transmissions may be considered for the same and/or a different RAT as the communication between the network node and the wireless communication device.

The number of time units equaling the periodicity of the measurement gaps may be an odd number in some embodiments.

In some embodiments, the maximum response time may be defined as the minimum of an uplink maximum response time imposed on the network node according to the ARQ protocol and a downlink maximum response time imposed on the wireless communication device according to the ARQ protocol.

The length of the measurement gaps of the measurement gap configuration may also be smaller than (half of) a round-trip time between the network node and the wireless communication device according to some embodiments.

A second aspect is a method for a wireless communication device configured to communicate with a network node of a cellular communication system according to an automatic repeat request (ARQ) protocol having a requirement that a number of time units between reception of an ARQ packet and transmission of an associated response message is smaller than a maximum response time.

The method comprises transmitting at least one measurement gap adaptation signal to the network node, receiving an indication of a measurement gap configuration from the network node (wherein the measurement gap configuration is determined by the network node based on the measurement gap adaptation signal, and wherein measurement gaps of the measurement gap configuration have a length smaller than the maximum response time), and using the measurement gap configuration to perform measurements.

Performing the measurements may, in some embodiments, comprise combining measurements of two or more measurement gaps of the measurement gap configuration into a single measurement result.

According to some embodiments, performing the measurements may comprise receiving two or more (e.g. more than three) synchronization signals in different measurement gaps of the measurement gap configuration and determining a number of separating time units separating each of the received synchronization signals from a subsequently received synchronization signal. Then, performing the measurements may comprise (for each of a plurality of hypotheses regarding a time unit number of a first received of the received synchronization signals and regarding a synchronization signal series) correlating the received synchronization signals with corresponding synchronization signal sequences (wherein the corresponding synchronization signal sequences are selected according to the hypothesis, the determined number of separating time units, and the synchronization signal series), and determining the synchronization signal series having maximum correlation among the hypotheses as a detected synchronization signal series.

In some embodiments, the second aspect may additionally have features identical with or corresponding to any of the various features as explained above for the first aspect.

A third aspect is a computer program product comprising a computer readable medium, having thereon a computer program comprising program instructions. The computer program is loadable into a data-processing unit and adapted to cause execution of the method according to any of the first and/or second aspects when the computer program is run by the data-processing unit.

A fourth aspect is an arrangement for a network node of a cellular communication system configured to communicate with a wireless communication device according to an automatic repeat request (ARQ) protocol having a requirement that a number of time units between reception of an ARQ packet and transmission of an associated response message is smaller than a maximum response time.

The arrangement comprises a controller adapted to determine a measurement gap configuration of the wireless communication device based on at least one measurement gap adaptation signal received from the wireless communication device (wherein measurement gaps of the measurement gap configuration have a length smaller than the maximum response time, and wherein the measurement gap configuration is for performing measurements by the wireless communication device), and cause transmission of an indication of the measurement gap configuration to the wireless communication device.

In some embodiments, the arrangement may further comprise a receiver adapted to receive the at least one measurement gap adaptation signal from the wireless communication device and a transmitter adapted to transmit the indication of the measurement gap configuration to the wireless communication device.

In some embodiments, the fourth aspect may additionally have features identical with or corresponding to any of the various features as explained above for the first aspect.

A fifth aspect is a network node of a cellular communication system comprising the arrangement according to the fourth aspect.

A sixth aspect is an arrangement for a wireless communication device configured to communicate with a network node of a cellular communication system according to an automatic repeat request (ARQ) protocol having a requirement that a number of time units between reception of an ARQ packet and transmission of an associated response message is smaller than a maximum response time.

The arrangement comprises a controller adapted to cause transmission of at least one measurement gap adaptation signal to the network node and use a measurement gap configuration to perform measurements, wherein an indication of the measurement gap configuration is received from the network node, wherein the measurement gap configuration is determined by the network node based on the measurement gap adaptation signal, and wherein measurement gaps of the measurement gap configuration have a length smaller than the maximum response time.

In some embodiments, the arrangement may further comprise a transmitter adapted to transmit the at least one measurement gap adaptation signal to the network node and a receiver adapted to receive the indication of the measurement gap configuration from the network node.

In some embodiments, the sixth aspect may additionally have features identical with or corresponding to any of the various features as explained above for the second aspect.

A seventh aspect is a wireless communication device comprising the arrangement according to the sixth aspect.

An advantage of some embodiments is that low latency requirements may be fulfilled even when measurements need to be performed on other RATS/frequencies than that of currently ongoing communication.

According to some embodiments, shorter measurement gaps improve the robustness of mission-critical MTC applications. In some cases, the measurements may be entirely transparent to the user plane. Alternatively or additionally, operation of previously infeasible types of MTC applications may be enabled in commercial cellular communication networks.

BRIEF DESCRIPTION OF THE DRAWINGS

Further objects, features and advantages will appear from the following detailed description of embodiments, with reference being made to the accompanying drawings, in which.

DETAILED DESCRIPTION

The term UE (user equipment) is used herein for illustrative purposes. It is meant to include any applicable wireless communication device (e.g. a MTC device, a C-MTC device, a mobile station (MS), etc.).

The term network node is used herein to denote one or more relevant network entities. It is meant to include any applicable network entity (e.g. a 4G evolved NodeB (eNodeB, eNB), a 3G NodeB (NB), a 3G Radio Network Controller (RNC), a 2G Base Station (BS), a 2G Base Station Controller (BSC), etc.)

The term measurement gap refers herein to a gap with the purpose to allow the UE to momentarily stop communicating with the serving cell(s) and tune to other carriers (frequencies)—potentially belonging to other radio access technologies—to perform measurements (e.g. search for, detect and/or monitor neighboring cells). Such gaps may, for instance, include (but is not limited to) 4G measurement gaps, 3G FDD transmission gaps (a.k.a. compressed mode gaps), 3G TDD (time division duplex) LCR (Low Chip Rate) DCH (Dedicated CHannel) measurement occasions, 3G TDD LCR idle intervals, 3G TDD LCR unused time slots, 3G FACH (Forward Access CHannel) measurement occasions, and 2G idle frames.

In the following, embodiments will be described where inter-frequency and/or inter-RAT measurements are enabled via creation of measurement gaps in ongoing communication. The measurement gap configuration comprises shorter than normal measurement gaps and is such that requirements of low latency (e.g. for C-MTC devices) may still be met.

In some embodiments (e.g. when the ongoing communication is 4G communication), the radio link interruption due to a measurement gap may be reduced from 10 ms to 2 ms (downlink) and 3 ms (uplink) as will be exemplified later in this description.

According to some embodiments, the shorter than normal measurement gaps may be used to perform measurements (e.g. cell search) by combining pieces of synchronization signals collected in different measurement gaps. Such combination may be carried out until all possible timings of synchronization signals have been investigated, or until an acceptable result has been achieved.

Figure 1:
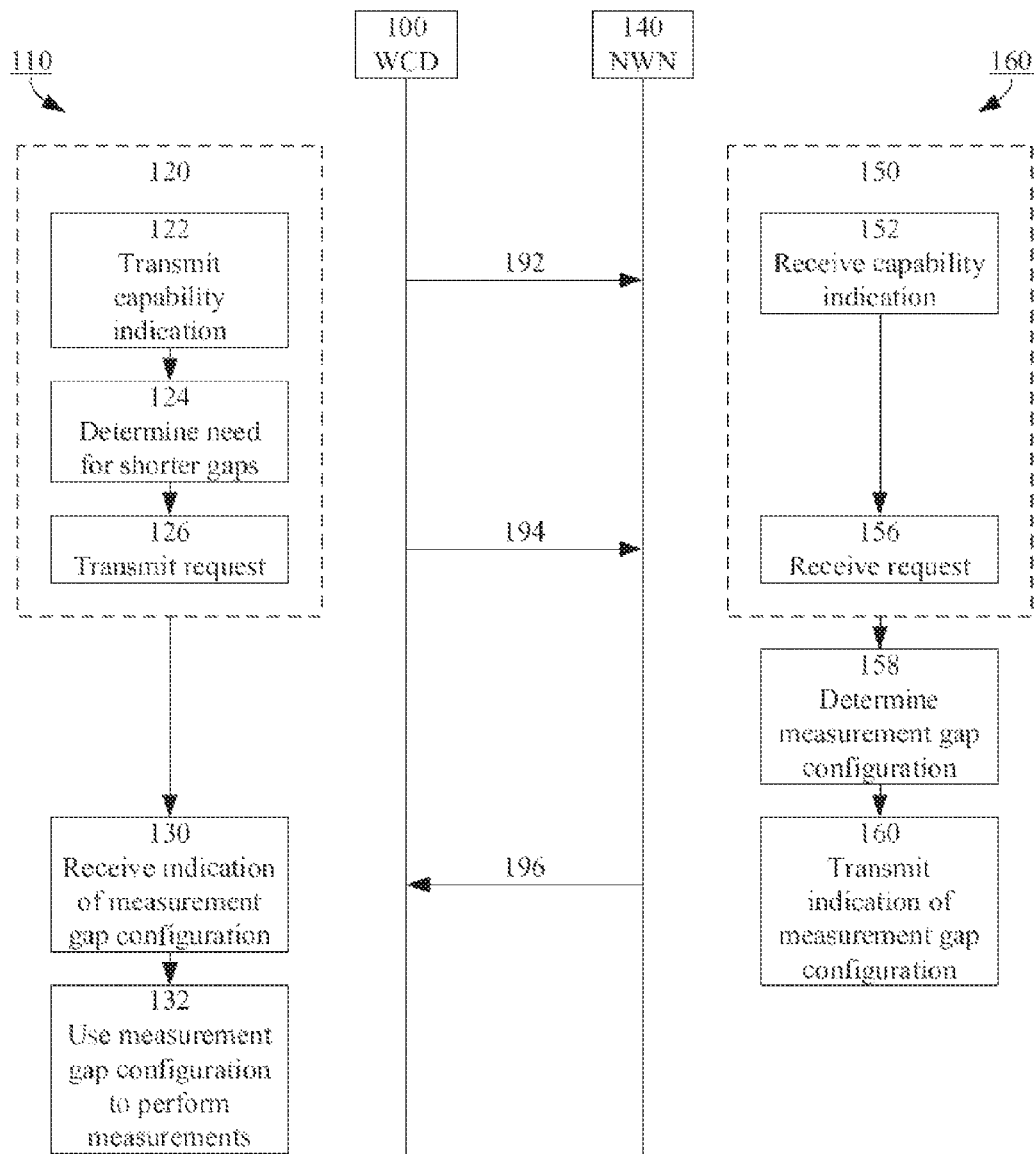
FIG. 1 is a combined flowchart and signaling diagram illustrating example method steps and signaling according to some embodiments.

FIG. 1 illustrates an example method 110 performed by a wireless communication device (WCD) 100, an example method 160 performed by a network node (NWN) 140 of a cellular communication system, and corresponding example signaling between the wireless communication device 100 and the network node 140.

The network node 140 and the wireless communication device 100 are configured to communicate with each other according to an automatic repeat request (ARQ) protocol.

The ARQ protocol has a requirement that a number of time units between reception of an ARQ packet and transmission of an associated response message (e.g. ACK/NAK) is smaller than a maximum response time.

If an ARQ protocol is used for both uplink (UL) and downlink (DL) there may be symmetry or asymmetry regarding the imposed maximum response times. In the case of asymmetry, the maximum response time may be defined as the minimum of the uplink maximum response time and the downlink maximum response time.

The method 110 starts in step 120 where the wireless communication device 100 transmits at least one measurement gap adaptation signal 192, 194 to the network node 140.

Correspondingly, the method 160 starts in step 150 where the network node 140 receives the at least one measurement gap adaptation signal 192, 194 from the wireless communication device 100.

The at least one measurement gap adaptation signal may comprise an indication 192 of a capability of the wireless communication device to operate according to one or more measurement gap configurations with measurement gap lengths smaller than the maximum response time. Alternatively or additionally, the at least one measurement gap adaptation signal may comprise a request 194 by the wireless communication device to be configured to operate according to one or more measurement gap configurations with measurement gap lengths smaller than the maximum response time. A few example scenarios where these different measurement gap adaptation signals may be applicable are given in the following.

If a wireless communication device always has low latency requirements, step 120 may comprise only sub-step 122, where an indication of the capability 192 is transmitted to the network node which receives it in sub-step 152.

The indication of the capability 192 may, for example be transmitted at start-up of the device, as part of a registration procedure towards the network and/or as part of an update procedure towards the network.

If a wireless communication device switches between having low latency requirements and normal latency requirements, step 120 may comprise only sub-steps 124 and 126. In sub-step 124, the wireless communication device determines that there is a need for shorter measurement gaps (e.g. in association with a switch between operation modes) and in step 126 a corresponding request 194 is transmitted to the network node which receives it in sub-step 156.

The request 194 may be transmitted once (e.g. when a need for shorter gaps is determined) or it may be repeated at some (regular) time intervals as long as the need for shorter gaps exists.

In some embodiments, a request may indicate a rejection of a measurement gap configuration (e.g. a legacy type measurement gap configuration) received from the network node.

When there is no longer any need for the shorter measurement gaps, steps similar to sub-steps 124 and 126 may be carried out to switch back to a normal measurement gap configuration. Alternatively, the network may autonomously switch back to a normal measurement gap configuration when a certain time has elapsed from the latest received request 194.

In some embodiments, step 120 may comprise all of the sub-steps 122, 124, and 126 if a wireless communication device switches between having low latency requirements and normal latency requirements.

In step 158, the network node 140 determines a measurement gap configuration of the wireless communication device based on the measurement gap adaptation signal. The measurement gaps of the measurement gap configuration have a length that is smaller than the maximum response time.

In some embodiments, a further requirement of the length of the measurement gaps is that they are smaller than the round-trip time (or half the round-trip time) between the network node and the wireless communication device.

The measurement gap configuration may also specify a periodicity of the measurement gaps. The periodicity of the measurement gaps may fulfill the following requirements:
being larger than a maximum time between transmission of the ARQ packet and reception of the associated response message,
a number of time units equaling the periodicity of the measurement gaps being different from a multiple of a number of time units between occurrences of synchronization signal transmissions of the cellular communication system, and
the number of time units equaling the periodicity of the measurement gaps being an odd number.

In step 160, the network node 140 transmits an indication 196 of the measurement gap configuration to the wireless communication device 100, which receives the indication 196 in step 130.

The wireless communication device 100 uses the measurement gap configuration indicated by the indication 196 to perform measurements in step 132.

Since the measurement gaps of the measurement gap configuration are shorter than normally, it may be beneficial (or even necessary) to combine measurements of two or more measurement gaps into a single measurement result (e.g. to capture all, or a sufficient part of, a measured synchronization signal).

Scenarios where various embodiments may be applicable will now be exemplified in the context of an ongoing communication according to a 3GPP 4G system where one or more of the following measurements need to be performed:
inter-frequency measurements for 3GPP 4G,
inter-RAT measurements for 3GPP 3G, and
inter-RAT measurements for 3GPP 2G.

It should be noted, however, that various embodiments may be equally applicable in other contexts.

In legacy 3GPP 4G systems (up to Rel. 12), inter-frequency and inter-RAT measurements are carried out in measurement gaps that are 6 ms long with a periodicity of 40 ms or 80 ms depending on the configuration.

Figure 2A:
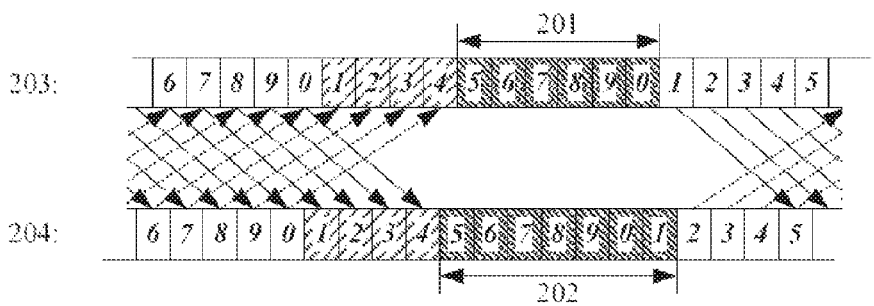
FIG. 2A is a schematic drawing illustrating problems associated with measurement gaps according to the prior art.

FIG. 2A illustrate the impact of such a measurement gap on an ongoing communication according to a HARQ protocol.

A measurement gap 201 of 6 ms (6 subframes) is shown for the downlink 203. Subframe numbers (6, 7, 8, . . . , 3, 4, 5) are indicated in each subframe for illustrative purposes. The subframe numbers are not to be confused with reference numbers and have, therefore, been shown using a different style than the reference numbers.

According to the 3GPP standard (see e.g. 3GPP TS36.133 v.12.6.0 clause 8.1), a wireless communication device (UE, MTC device, C-MTC device) operating on a 4G FDD carrier shall not transmit on the uplink in the subframe occurring immediately after a measurement gap. Hence, since the measurement gap 201 is 6 subframes in the downlink, a corresponding measurement gap 202 for the uplink 204 is 7 subframes (7 ms) as illustrated in FIG. 2A.

The measurement gaps are indicated by a densely striped pattern in the corresponding subframe in FIG. 2A.

A network node transmitting a transport block to the UE in any of the four subframes preceding the gap 201 cannot get any feedback (response message with ACK/NAK in accordance with the HARQ protocol) on the transmitted transport block, since the feedback is to be sent by the UE four subframes after reception (corresponding to the maximum response time), which would mean during the gap 202 in the example of FIG. 2A. If no feedback is received, a non-adaptive retransmission will follow according to the standard (see e.g. 3GPP TS36.321 v.12.4.0 clause 5.4). To avoid this, network nodes generally do not transmit any transport blocks to the UE in the four subframes preceding a gap. This means that the interruption in the ongoing communication, caused by the 6 ms measurement gap, is in fact 10 ms (10 subframes) on the downlink.

A corresponding situation occurs for the uplink. Due to the gap 201, the UE cannot get feedback from the network node regarding whether or not uplink transmissions of transport blocks (transmitted in any of the four subframes preceding the gap 202) were successfully decoded. If no feedback is received, the standard (see e.g. 3GPP TS36.321 v.12.4.0 clause 5.4) stipulates that the UE shall consider the transmitted transport block as successfully decoded by the network node. If this is not the case, the network node has to schedule the UE to transmit the transport block again. To avoid this, network nodes generally do not schedule any transmissions from the UE in the four subframes preceding a gap. This means that the interruption in the ongoing communication, caused by the 7 ms measurement gap, is in fact 11 ms (11 subframes) on the uplink The four subframes preceding a measurement gap are indicated by a scarcely striped pattern in FIG. 2A.

The arrows from downlink to uplink and vice versa in FIG. 2A illustrate the dependency between transmissions of transport block and the corresponding feedback (response message), where a transport block transmitted where an arrow starts should have a corresponding feedback transmitted where the arrow ends.

A further complication (that is not illustrated by FIG. 2A) is due to the fact that, for a UE to transmit on the uplink it needs a scheduling grant (SG) from the network node, which it may request via a scheduling request (SR). The scheduling grant is applicable four subframes after the subframe in which it was received by the UE. Hence, if the UE receives a scheduling grant immediately after a measurement gap, it has to wait another four subframes to resume transmissions on the uplink. Hence the UL outage due to the gap is at least 11 ms (11 subframes) due to the measurement gap of 7 subframes and the delay between SR and SG of 4 subframes, and potentially more if the network node avoids scheduling the UE for uplink transmissions in the four subframes immediately before the gap as elaborated on above.

The de facto interruption (10-15 ms) of the ongoing communication due to measurement gaps may not be tolerable for low latency requirements (e.g. when a C-MTC device is in a mission-critical operation mode). Furthermore, due to robustness/reliability requirements, it may not be an option to restrict the possibilities for the wireless communication device to search for and monitor neighboring cells.

Therefore, embodiments suggest a measurement gap configuration with shorter measurement gaps than the normal 6 ms. Typically, the length of a measurement gap should be smaller than the maximum response time (4 ms in the example of FIG. 2A) to enable transmission (i.e. possibility of transmission of the response message) of transport blocks in at least some of the subframes preceding a measurement gap.

The minimum measurement time on a carrier to capture an intact pair of 3G PSCH and SSCH with arbitrary timing relative to the 4G serving cell frame timing is 0.73 ms, and corresponding minimum time for receiving a 2G TDMA (time division multiple access) slot carrying FCCH or SCH is 1.15 ms. Radio switching typically totals to 0.6 ms, which means that, in a typical example, the smallest gap that can support inter-RAT measurements has a length of 2 ms.

Using shorter measurement gaps than 6 ms, it is beneficial if the gaps occur with a periodicity in a manner that allows all possible timings of synchronization signals of the system under consideration for measurements to be investigated in a sequence of gaps rather than in a single gap (as in typical prior art approaches). Furthermore, it may be beneficial if the periodicity is long enough to not lose the benefits gained by the use of the shorter gap length.

Figure 2B:
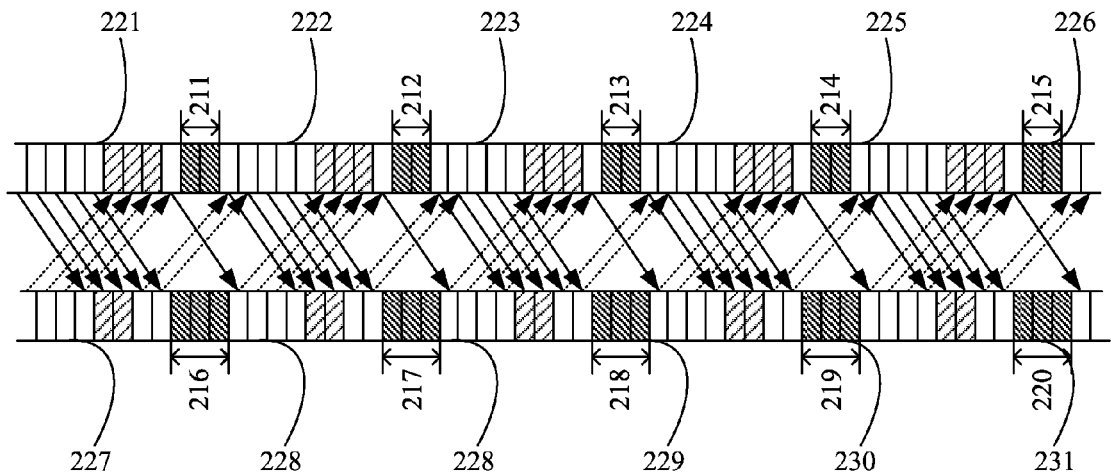
FIG. 2B is a schematic drawing illustrating an example measurement gap configuration according to some embodiments.
Figure 2C:
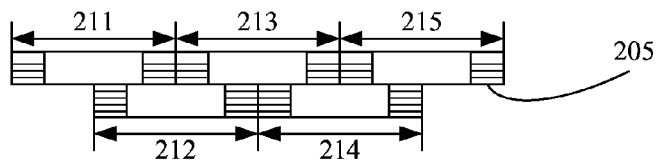
FIG. 2C is a schematic drawing illustrating an example of how synchronization signals may be collected over several measurement gaps according to some embodiments.
Figure 2D:
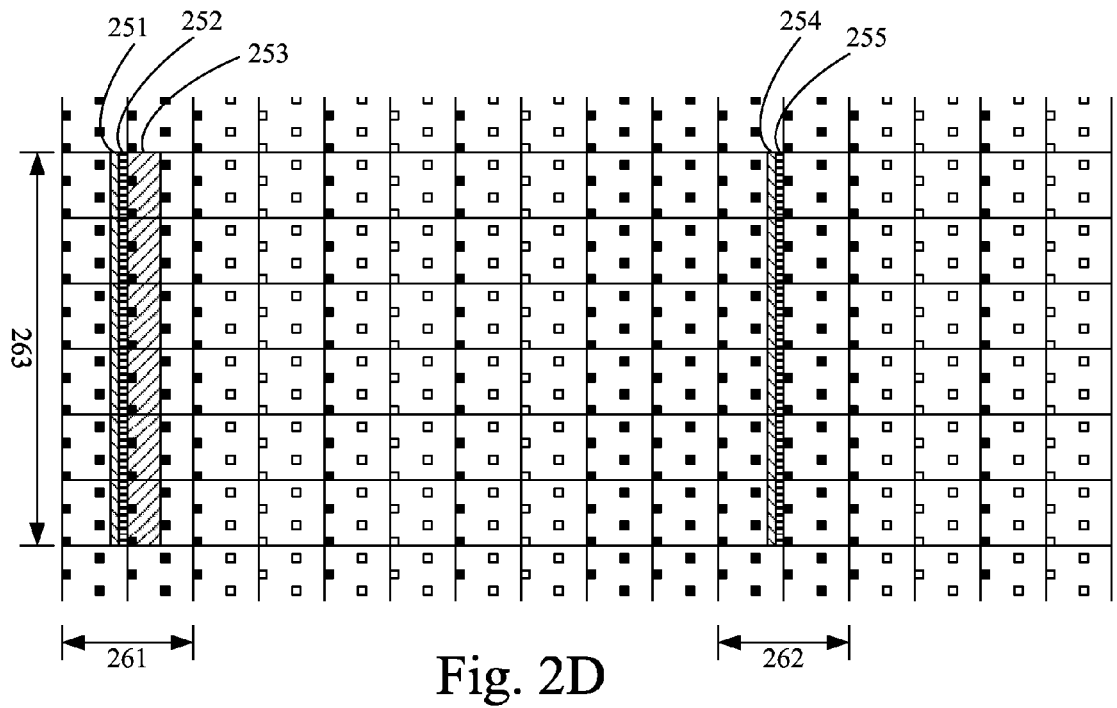
FIG. 2D is a schematic drawing illustrating an example distribution of synchronization signals in a time-frequency grid.

For a gap length of e.g. 2 ms, the periodicity should preferably be an odd number of subframes and different from a multiple of the 5 ms synchronization repetition period in order to allow detection of 4G cells with arbitrary timing as will be seen in connection top FIG. 2D.

Moreover the overlap of timings covered by gaps for a 4G synchronization signal period (compare with FIG. 2C) should preferably be a minimum of one OFDM symbol in order to ensure that an intact PSS or SSS can be acquired.

Taking HARQ operation and scheduling into account, a shorter periodicity than 11 ms may not be appropriate since it might limit the continuity of the HARQ processes (that otherwise function across the shortened gaps), e.g. by not providing opportunities for feedback, retransmissions, scheduling requests, and/or usage of scheduling grant.

Thus, an example measurement gap configuration may be provided as:
Gap length: 2 ms
Gap periodicity: $(2n+1)$ ms, where $n>5$, $(2n+1) \neq 5m$, and n and m are integers The measurement gap configuration may also define an offset (a relative position to the system frame number start). Such an offset may be defined in a same or similar manner as in the prior art.

Provided that the shortened gap length is fixed at 2 ms, the indication of the measurement gap configuration (compare with 196 of FIG. 1) transmitted by the network node to the wireless communication device may, for example, comprise the number n (and the offset if applicable). Alternatively, a number of measurement gap configurations may be predefined in terms of the number n (and the offset if applicable) and indexed, and the indication of the measurement gap configuration may comprise the index.

FIG. 2B illustrates an example measurement gap configuration according to some embodiments. The illustrative details (striping, arrows) are similar to those of FIG. 2A. In this measurement gap configuration, the gap length is 2 subframes in the downlink (see measurement gaps 211, 212, 213, 214, 215) and 3 subframes in the uplink (see measurement gaps 216, 217, 218, 219, 220). It can be seen that transmission of transport blocks is now possible for the one subframe immediately preceding the measurement gaps in the downlink and for the two subframes immediately preceding the measurement gaps in the uplink. Furthermore, some scheduling grants received just before a measurement gap may be used after the measurement gap since the measurement gap length is less than 4 subframes.

Reference numbers 221, 222, 223, 224, 225, 226 indicate the position of subframe number 0 in the downlink and reference numbers 227, 228, 229, 230, 231, 232 indicate the position of subframe number 0 in the uplink. It can be seen that due to the periodicity (11 subframes) of the measurement gap configuration, the position of the measurement gaps slides to eventually cover all subframe numbers. This ensures that all positions of the synchronization signals are covered by a measurement gap.

FIG. 2C illustrates this in more detail. In FIG. 2C, the downlink measurement gaps 211, 212, 213, 214, 215 of FIG. 2A have been grouped together to illustrate which subframe numbers they cover. The horizontally striped portions 205 of the measurement gaps illustrate a radio margin (typically around 0.4 ms) due to switching of frequency and/or RAT where measurements can typically not be performed. Since gap 211 covers subframes 5 and 6, gap 212 covers subframes 6 and 7, gap 213 covers subframes 7 and 8, and so on; all subframe numbers will eventually be covered by a part of a measurement gap that is not restricted as a radio margin. For example, 5 consecutive measurement gaps will always cover either subframe 0 or subframe 5 of a 4G FDD radio frame of 10 ms (compare with FIG. 2D) which ensures that the PSS and SSS is received.

FIG. 2D illustrates, in a radio frame of 10 ms, how the synchronization signals PSS 252, 255 and SSS 251, 254 are positioned in a time-frequency grid of a 4G FDD (frequency division duplex) system. The Physical Broadcast CHannel (PBSH) 253 is also shown as well as the Cell-specific Reference Signals (CRS; black squares—always present CRS, white squares—sometimes present CRS). The synchronization signals are located in subframes 0 (261) and 5 (262) in the central 72 subcarriers (263), with a repetition period of 5 ms.

By successfully detecting one instance of PSS and one instance of SSS, the UE acquires information regarding physical cell identity and radio frame timing, and thereby knows how CRS are coded and laid out in the time-frequency grid. The received strength and quality of CRS are measured and used for mobility decisions either by the UE or by the network node depending on the mode of operation (idle or connected mode).

Figure 3A:
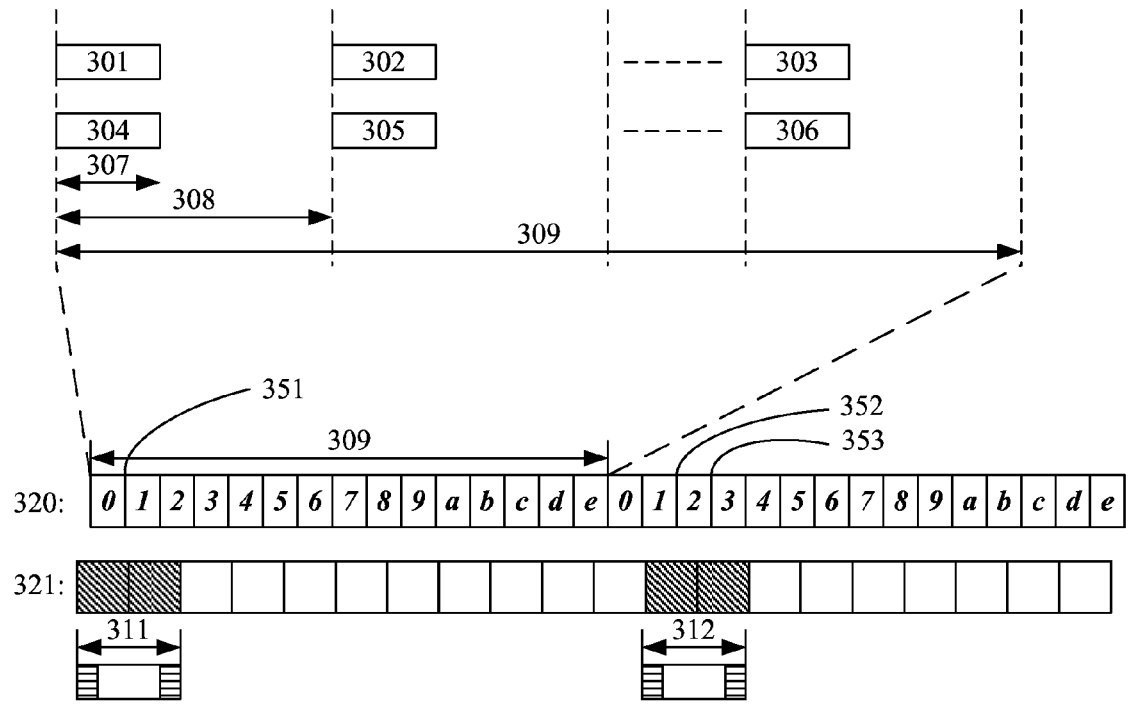
FIG. 3A is a schematic drawing illustrating an example measurement gap configuration and an example of how synchronization signals may be collected over several measurement gaps according to some embodiments.

FIG. 3A illustrates the application of a measurement gap configuration 321 similar to that of the 4G downlink in FIG. 2B (2 ms gap length, 11 ms periodicity) to measurements of synchronization signals in the downlink 320 of a 3G FDD system. Two gaps 311, 312 of the measurement gap configuration are shown.

The synchronization channel pattern of a 10 ms radio frame 309 of the 3G FDD system (see e.g. 3GPP TS25.211 v.10.0.0, clause 5.3.3.5) is also shown in FIG. 3A. The radio frame is divided into 14 slots 308. Slot numbers (0, 1, 2, . . . , c, d, e) are indicated in each slot of the 3G FDD system for illustrative purposes. The slot numbers are not to be confused with reference numbers and have, therefore, been shown using a different style than the reference numbers.

The synchronization channels PSCH 301, 302, 303 and SSCH 304, 305, 306 are overlaid and transmitted in the first $10^{th}$ 307 of each slot. PSCH carries the primary synchronization code (PSC) which is the same for all 3G FDD cells and all slots, and SSCH carries the secondary synchronization code (SSC) which may differ on a slot-within-the-frame basis according to a predetermined sequence associated with the scrambling code group (out of 64 possible scrambling code groups, each with a set of 8 potential scrambling codes) to which the cell belongs.

In favorable radio conditions, it may be enough to collect a pair of synchronization signals (which may be ensured by measuring at least up to 110/150 ms; about 0.73 ms)) to detect PSCH. However, several instances of the SSCH taken from different slots are typically needed in order to determine to which of the 64 scrambling code groups the cell belongs.

As illustrated in FIG. 3A, such several instances 351, 352, 353 of the synchronization signals may be collected by using the measurement gap configuration 321. In this example, the instances 351, 352, 353 of the synchronization signals are collected in slot order ( . . . , 1, 2, 3, . . . ) due to the particular choice of periodicity.

Figure 3B:
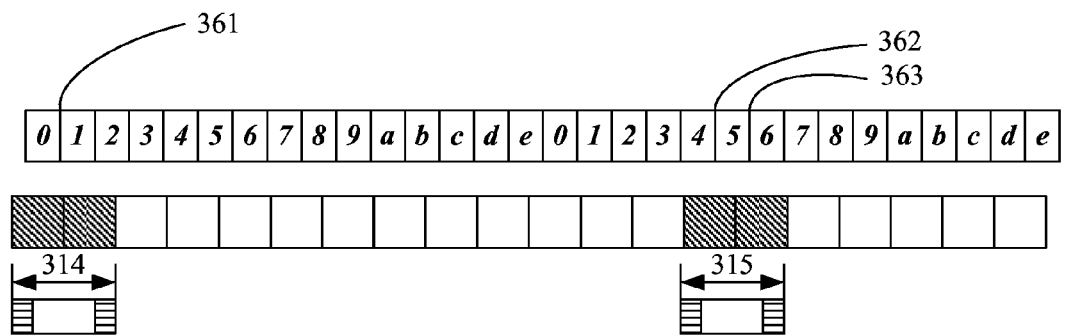
FIG. 3B is a schematic drawing illustrating an example measurement gap configuration and an example of how synchronization signals may be collected over several measurement gaps according to some embodiments.

FIG. 3B is similar to FIG. 3A but illustrates the application of a measurement gap configuration with gaps 314, 315 of length 2 ms and 13 ms periodicity to measurements of synchronization signals in the downlink of a 3G FDD system. In this example, the instances 361, 362, 363 of the synchronization signals are not collected in slot order ( . . . , 1, 5, 6, . . . ) due to the choice of periodicity.

The PSC detection may be carried out by matched filtering where the filter output is stored in a circular buffer containing as many elements as needed to represent one slot. In each measurement gap, the filter may be fed with enough samples to produce one output for each element in the circular buffer. The equivalent distance in 3G FDD radio samples between the first sample fed to the filter in previous measurement gap and ditto in the current measurement gap may be calculated, and the starting point in the circular buffer may be adjusted accordingly so that an element in the circular buffer is always associated with the same phase in a 3G slot regardless of the measurement gap. The matched filter outputs from different measurement gaps may be accumulated non-coherently, and when a sufficient number of measurement gaps have been analyzed peaks may be identified in the matched filter outputs as indicative of the existence of one or more 3G cells.

Once the PSC has been detected, the scrambling code group may be determined. A number of SSC may be collected and correlated with predefined sequences for each of the 64 possible scrambling code groups.

The following table illustrates an example SSCH encoding (which SSC is transmitted in each slot) for scrambling code groups (see e.g. 3GPP TS25.213 v.10.0.0, clause 5.2.3.2):

| Scrambling Code Group | slot number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | a | b | c | d | e |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |

-continued

| Scrambling Code Group | slot number | | | | | | | | | | | | | |
|---|---|---|---|---|---|---|---|---|---|---|---|---|---|---|
| | 0 | 1 | 2 | 3 | 4 | 5 | 6 | 7 | 8 | 9 | a | b | c | d | e |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| . | . | . | . | . | . | . | . | . | . | . | . | . | . | . | . |
| Group 63 | 9 | 12 | 10 | 15 | 13 | 14 | 9 | 14 | 15 | 11 | 11 | 13 | 12 | 16 | 10 |

Typically, a decision regarding which scrambling code group is detected becomes better the more instances of SSCH from different slot numbers is collected. Using very few instances typically means that an unambiguous decision cannot be taken (see, for instance, slot numbers 0 and 1 where several scrambling code groups have the same SSC).

One approach to the cell detection which may be applicable to the case illustrated in FIG. 3A is to determine the scrambling code group based on SSCH instances comprising at least 4 consecutive slot numbers, correlating the received SSCH with the sequences for the corresponding slot numbers in the table above for each hypothesized scrambling code group (row of the table), and selecting the scrambling code group with the highest correlation.

A similar approach may be used for the case illustrated in FIG. 3B, but since the SSCH instances are not collected in slot number order an additional step of selecting which sequences (slot number, column of the table) to correlate with may be applied. This makes it possible to use (and make a decision based on) the SSCH instances in the order they are collected instead of having to wait until SSCH instances corresponding to consecutive slot numbers are collected.

Thus, performing the measurements in step 132 of FIG. 1 in the context of FIG. 3B may comprise collecting two or more instances of SSCH in different measurement gaps 314, 315 of the measurement gap configuration and determining a number of separating slots (corresponding to columns of the table above) between the instances.

Then, hypotheses are made regarding scrambling code group (corresponding to rows of the table above) and which slot number (corresponding to a column of the table above) the first collected instance corresponds to.

For each hypothesis, the received SSCH instances are correlated with the sequences for the corresponding slot numbers and scrambling code group in the table above, and the hypothesis (defining scrambling code group and first collected slot number) with the highest correlation is selected.

In one example, the procedure can be summarized as follows:
Collect and decode K>3 instances of SSC: $\{S_1, S_2, \ldots, S_K\}$.
Calculate distances $\{n_2, \ldots, n_K\}$ in terms of slots to the first instance $S_1$.
For each scrambling code group (corresponding to a row in the table above) and for each offset m=0 . . . 15, correlate sequence $\{S_1, S_2, \ldots, S_K\}$ with columns $\{m, \text{mod}_{15}(m+n_2), \ldots, \text{mod}_{15}(m+n_K)\}$ of the table above.
Determine the scrambling code group and the frame timing (slot number of first instance $S_1$) from the row of the table and value of m that yield the maximum correlation.

Figure 4:
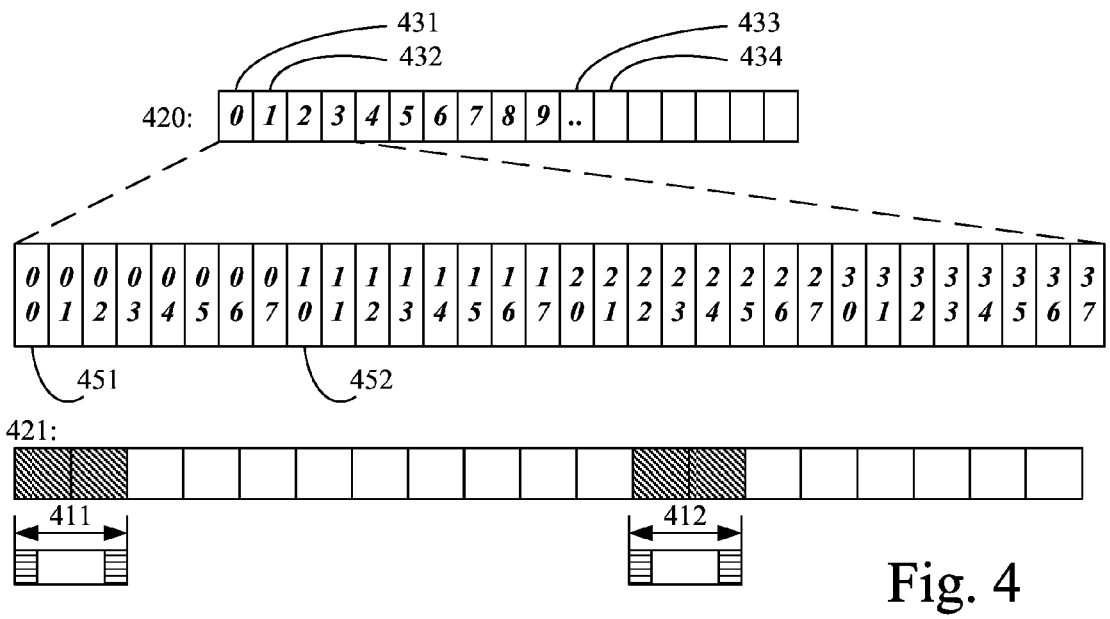
FIG. 4 is a schematic drawing illustrating an example measurement gap configuration and an example of how synchronization signals may be collected according to some embodiments.

FIG. 4 illustrates the application of a measurement gap configuration 421 similar to that of the 4G downlink in FIG. 2B (2 ms gap length, 11 ms periodicity) to measurements of synchronization signals in the downlink 420 of a 2G system. Two gaps 411, 412 of the measurement gap configuration are shown.

The FCCH, constituting a primary synchronization signal, and SCH, constituting a secondary synchronization signal are transmitted in a multiframe structure consisting of 51 TDMA radio frames. Each TDMA radio frame 431, 432, 433, 434 corresponds to 120/26 ms and is further divided into 8 slots 451, 452. FCCH is transmitted in the first slot 451 of TDMA frames 0 (431), 10 (433), 20, 30, and 40 and the same code is transmitted in all cells and slots. SCH is transmitted in the first slot 452 of TDMA frames 1 (432), 11 (434), 21, 31 and 41. It carries BSIC and the frame number of the TDMA frame that hosts the decoded instance of SCH.

In cell detection for such systems the received power is typically first measured (e.g. by acquiring a received signal strength indication, RSSI) on a GSM carrier, and if the received power is large enough (e.g. compared to other GSM carriers) the UE may search for FCCH.

When measurements are carried out in time-constrained measurement gaps the search for FCCH may continue over several gaps until FCCH is detected or until a timer expires (by which the UE may prioritize searches on other carriers).

Once the FCCH is detected the UE knows where to find SCH and can seize the next opportunity to acquire and decode it.

In the case when the 4G measurement gap configuration uses a 10 ms radio frame and 2G uses a 4.615 ms radio frame, a 2G synchronization channel will be detected eventually regardless of the choice of measurement gap periodicity.

Figure 5:
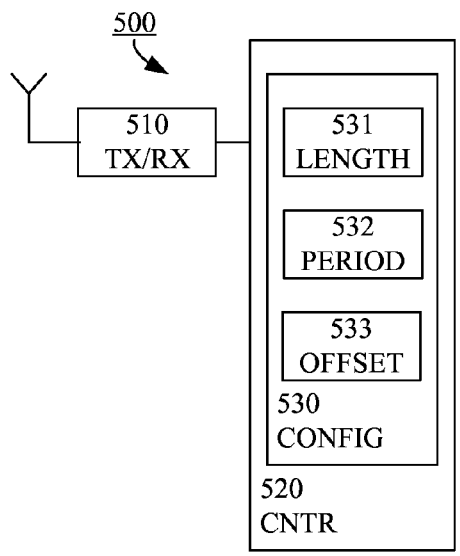
FIG. 5 is a block diagram illustrating an example arrangement according to some embodiments.

FIG. 5 schematically illustrates an example arrangement 500 for a network node of a cellular communication system. The arrangement 500 may, for example, be adapted to perform the method 160 of FIG. 1.

Figure 6:
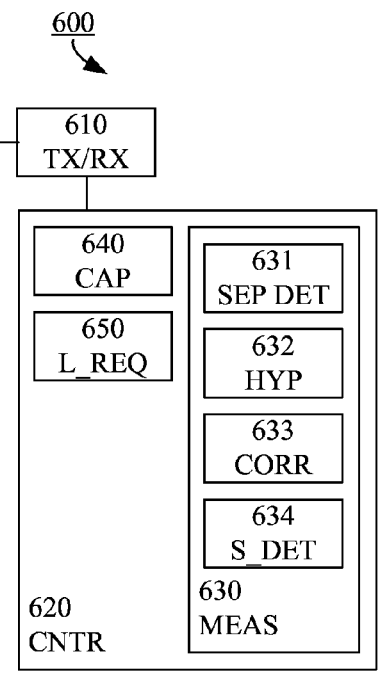
FIG. 6 is a block diagram illustrating an example arrangement according to some embodiments.

FIG. 6 schematically illustrates an example arrangement 600 for a wireless communication device. The arrangement 600 may, for example, be adapted to perform the method 110 of FIG. 1.

The network node comprising the arrangement 500 is configured to communicate with the wireless communication device comprising the arrangement 600 according to an ARQ protocol in a similar manner as described in connection with FIG. 1.

Each of the arrangements 500 and 600 comprises a controller (CNTR) 520 and 620, respectively, adapted to cause execution of the method steps as described in connection with FIG. 1. Each of the arrangements 500 and 600 may also comprise a transceiver (TX/RX) 510 and 610, respectively, adapted to perform the transmissions and receptions as described in connection with FIG. 1.

The controller 520 of the arrangement 500 may comprise a configuration unit (CONFIG) 530 adapted to determine the measurement gap configuration as described herein. For example, the configuration unit 530 may be adapted to use a measurement gap length (LENGTH) 531, a measurement gap periodicity (PERIOD) 532, and a measurement gap offset (OFFSET) 533 as exemplified above.

The controller 620 of the arrangement 600 may be adapted to communicate to the network node a capability (CAP) 640 to operate according to a measurement gap configuration with shorter than normal measurement gaps.

Alternatively or additionally, the controller 620 of the arrangement 600 may be adapted to request from the network node a measurement gap configuration with shorter than normal measurement gaps based on a current latency requirement (L_REQ) 650 of the wireless communication device.

The controller 620 of the arrangement 600 may comprise a measuring unit (MEAS) 630 adapted to perform inter-frequency and/or inter-RAT measurements using a measurement gap configuration as described herein.

For example, the measuring unit 630 may comprise a separation determiner (SEP DET) adapted to determine a distance between collected instances of a synchronization signal, a hypothesizer (HYP) 632 adapted to lay out hypotheses regarding the synchronization signal and the time offset of the measurement gaps compared to a synchronization signal reference, a correlator (CORR) 633 adapted to correlate the collected instances of the synchronization signal which known synchronization signal sequences according to the hypotheses, and a synchronization signal detector (S_DET) 634 adapted to select one of the hypotheses based on the correlation result and consider the corresponding synchronization signal sequence as detected.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising circuitry/logic or performing methods according to any of the embodiments. The electronic apparatus may, for example, be a portable or handheld mobile radio communication equipment, a mobile radio terminal, a mobile telephone, a base station, a base station controller, a communicator, an electronic organizer, a smartphone, a computer, a notebook, or a mobile gaming device.

Figure 7:
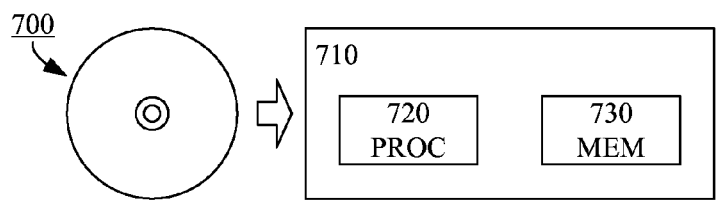
FIG. 7 is a schematic drawing illustrating a computer readable medium according to some embodiments.

According to some embodiments, a computer program product comprises a computer readable medium such as, for example, a diskette, a USB-stick, a plug-in card, an embedded drive, or a CD-ROM as illustrated by 700 of FIG. 7. The computer readable medium 700 may have stored thereon a computer program comprising program instructions. The computer program may be loadable into a data-processing unit (PROC) 720, which may, for example, be comprised in a device 710 such as a wireless communication device or a network node. When loaded into the data-processing unit 720, the computer program may be stored in a memory (MEM) 730 associated with or integral to the data-processing unit 720. According to some embodiments, the computer program may, when loaded into and run by the data-processing unit, cause the data-processing unit to execute method steps according to, for example, any of the methods shown in FIG. 1.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for a network node of a cellular communication system configured to communicate with a wireless communication device according to an automatic repeat request (ARQ) protocol having a requirement that a length of time between reception of an ARQ packet and transmission of an associated response message is smaller than a predefined maximum response time, wherein during intervals of time denoted measurement gaps, the wireless communication device is permitted to momentarily stop communicating with a serving cell in order to perform measurements on its radio environment, the method comprising:

receiving at least one measurement gap adaptation signal from the wireless communication device;

determining a measurement gap configuration of the wireless communication device based on the measurement gap adaptation signal, wherein measurement gaps of the measurement gap configuration have a length smaller than the maximum response time, and wherein the measurement gap configuration is for performing measurements by the wireless communication device, wherein:

the measurements are of a signal whose timing is unknown to the wireless communication device;

the signal includes a periodically transmitted synchronization signal; and the measurement gap configuration specifies a periodicity of the measurement gaps that is configured to ensure that a plurality of measurements made at different times and in accordance with the measurement gap configuration includes pairs of measurements such that each member of the measurement pair includes a same overlapping part of the signal with respect to the timing of the signal, and each member of the measurement pair includes a different part of the signal with respect to the timing of the signal, wherein a length of the overlapping part is at least a predefined minimum amount that ensures that an intact synchronization signal will fit within a single measurement; and transmitting an indication of the measurement gap configuration to the wireless communication device.

2. The method of claim 1, wherein the at least one measurement gap adaptation signal comprises an indication of a capability of the wireless communication device to operate according to one or more measurement gap configurations with measurement gap lengths smaller than the maximum response time.

3. The method of claim 1, wherein the at least one measurement gap adaptation signal comprises a request by the wireless communication device to be configured to operate according to one or more measurement gap configurations with measurement gap lengths smaller than the maximum response time.

4. The method of claim 1, wherein the periodicity of the measurement gaps is larger than a maximum time between transmission of the ARQ packet and reception of the associated response message.

5. The method of claim 1, wherein a number of time units equaling the periodicity of the measurement gaps is different from a multiple of a number of time units between occurrences of synchronization signal transmissions of the cellular communication system.

6. The method of claim 5, wherein the number of time units equaling the periodicity of the measurement gaps is an odd number.

7. The method of claim 1, wherein the maximum response time is defined as a minimum of:
an uplink maximum response time imposed on the network node according to the ARQ protocol; and
a downlink maximum response time imposed on the wireless communication device according to the ARQ protocol.

8. The method of claim 1, wherein the length of the measurement gaps of the measurement gap configuration is also smaller than a round-trip time between the network node and the wireless communication device.

9. The method of claim 8, wherein the length of the measurement gaps of the measurement gap configuration is smaller than half the round-trip time between the network node and the wireless communication device.

10. A method for a wireless communication device configured to communicate with a network node of a cellular communication system according to an automatic repeat request (ARQ) protocol having a requirement that a length of time between reception of an ARQ packet and transmission of an associated response message is smaller than a predefined maximum response time, wherein during intervals of time denoted measurement gaps, the wireless communication device is permitted to momentarily stop communicating with a serving cell in order to perform measurements on its radio environment, the method comprising:
transmitting at least one measurement gap adaptation signal to the network node;
receiving an indication of a measurement gap configuration from the network node, wherein the measurement gap configuration is determined by the network node based on the measurement gap adaptation signal, and wherein measurement gaps of the measurement gap configuration have a length smaller than the maximum response time; and
using the measurement gap configuration to perform measurements,
wherein performing the measurements comprises:
receiving two or more synchronization signals in different measurement gaps of the measurement gap configuration;
determining a number of separating time units separating each of the received synchronization signals from a subsequently received synchronization signal;
for each of a plurality of hypotheses regarding a time unit number of a first received of the received synchronization signals and regarding a synchronization signal series:
correlating the received synchronization signals with corresponding synchronization signal sequences, wherein the corresponding synchronization signal sequences are selected according to the hypothesis, the determined number of separating time units, and the synchronization signal series; and
determining the synchronization signal series having maximum correlation among the hypotheses as a detected synchronization signal series.

11. The method of claim 10, wherein the at least one measurement gap adaptation signal comprises an indication of a capability of the wireless communication device to operate according to one or more measurement gap configurations with measurement gap lengths smaller than the maximum response time.

12. The method of claim 10, wherein the at least one measurement gap adaptation signal comprises a request by the wireless communication device to be configured to operate according to one or more measurement gap configurations with measurement gap lengths smaller than the maximum response time.

13. The method of claim 10, wherein the measurement gap configuration specifies a periodicity of the measurement gaps.

14. The method of claim 13, wherein the periodicity of the measurement gaps is larger than a maximum time between transmission of the ARQ packet and reception of the associated response message.

15. The method of claim 13, wherein a number of time units equaling the periodicity of the measurement gaps is different from a multiple of a number of time units between occurrences of synchronization signal transmissions of the cellular communication system.

16. The method of claim 15, wherein the number of time units equaling the periodicity of the measurement gaps is an odd number.

17. The method of claim 10, wherein performing the measurements comprises combining measurements of two or more measurement gaps of the measurement gap configuration into a single measurement result.

18. The method of claim 10, wherein the maximum response time is defined as the minimum of:
an uplink maximum response time imposed on the network node according to the ARQ protocol; and
a downlink maximum response time imposed on the wireless communication device according to the ARQ protocol.

19. The method of claim 10, wherein the length of the measurement gaps of the measurement gap configuration is also smaller than a round-trip time between the network node and the wireless communication device.

20. The method of claim 19, wherein the length of the measurement gaps of the measurement gap configuration is smaller than half the round-trip time between the network node and the wireless communication device.

21. A nontransitory computer readable medium having thereon a computer program comprising program instructions, the computer program being loadable into a data-processing unit and configured to cause execution of a method when the computer program is run by the data-processing unit, wherein the method is for a network node of a cellular communication system configured to communicate with a wireless communication device according to an automatic repeat request (ARQ) protocol having a requirement that a length of time between reception of an ARQ packet and transmission of an associated response message is smaller than a predefined maximum response time, wherein during intervals of time denoted measurement gaps, the wireless communication device is permitted to momentarily stop communicating with a serving cell in order to perform measurements on its radio environment, the method comprising:
receiving at least one measurement gap adaptation signal from the wireless communication device;
determining a measurement gap configuration of the wireless communication device based on the measurement gap adaptation signal, wherein measurement gaps of the measurement gap configuration have a length smaller than the maximum response time, and wherein the measurement gap configuration is for performing measurements by the wireless communication device, wherein:
the measurements are of a signal whose timing is unknown to the wireless communication device;
the signal includes a periodically transmitted synchronization signal; and
the measurement gap configuration specifies a periodicity of the measurement gaps that is configured to ensure that a plurality of measurements made at different times and in accordance with the measurement gap configuration includes pairs of measurements such that each member of the measurement pair includes a same overlapping part of the signal with respect to the timing of the signal, and each member of the measurement pair includes a different part of the signal with respect to the timing of the signal, wherein a length of the overlapping part is at least a predefined minimum amount that ensures that an intact synchronization signal will fit within a single measurement; and
transmitting an indication of the measurement gap configuration to the wireless communication device.

22. An arrangement for a network node of a cellular communication system configured to communicate with a wireless communication device according to an automatic repeat request (ARQ) protocol having a requirement that a length of time between reception of an ARQ packet and transmission of an associated response message is smaller than a predefined maximum response time, wherein during intervals of time denoted measurement gaps, the wireless communication device is permitted to momentarily stop communicating with a serving cell in order to perform measurements on its radio environment, the arrangement comprising:
an interface, wherein the interface is configured to supply control signals to a transceiver; and
a controller adapted to:
determine a measurement gap configuration of the wireless communication device based on at least one measurement gap adaptation signal received from the wireless communication device, wherein measurement gaps of the measurement gap configuration have a length smaller than the maximum response time, and wherein the measurement gap configuration is for performing measurements by the wireless communication device, wherein:
the measurements are of a signal whose timing is unknown to the wireless communication device;
the signal includes a periodically transmitted synchronization signal; and
the measurement gap configuration specifies a periodicity of the measurement gaps that is configured to ensure that a plurality of measurements made at different times and in accordance with the measurement gap configuration includes pairs of measurements such that each member of the measurement pair includes a same overlapping part of the signal with respect to the timing of the signal, and each member of the measurement pair includes a different part of the signal with respect to the timing of the signal, wherein a length of the overlapping part is at least a predefined minimum amount that ensures that an intact synchronization signal will fit within a single measurement; and
cause transmission of an indication of the measurement gap configuration to the wireless communication device.

23. The arrangement of claim 22, wherein the at least one measurement gap adaptation signal comprises an indication of a capability of the wireless communication device to operate according to one or more measurement gap configurations with measurement gap lengths smaller than the maximum response time.

24. The arrangement of claim 22, wherein the at least one measurement gap adaptation signal comprises a request by the wireless communication device to be configured to operate according to one or more measurement gap configurations with measurement gap lengths smaller than the maximum response time.

25. The arrangement of claim 22, wherein the periodicity of the measurement gaps is larger than a maximum time between transmission of the ARQ packet and reception of the associated response message.

26. The arrangement of claim 22, wherein a number of time units equaling the periodicity of the measurement gaps is different from a multiple of a number of time units between occurrences of synchronization signal transmissions of cellular communication system.

27. The arrangement of claim 26, wherein the number of time units equaling the periodicity of the measurement gaps is an odd number.

28. The arrangement of claim 22, further comprising:
a receiver adapted to receive the at least one measurement gap adaptation signal from the wireless communication device; and
a transmitter adapted to transmit the indication of the measurement gap configuration to the wireless communication device.

29. The arrangement of claim 22, wherein the maximum response time is defined as a minimum of:
an uplink maximum response time imposed on the network node according to the ARQ protocol; and
a downlink maximum response time imposed on the wireless communication device according to the ARQ protocol.

30. The arrangement of claim 22, wherein the length of the measurement gaps of the measurement gap configuration is also smaller than a round-trip time between the network node and the wireless communication device.

31. The arrangement of claim 30, wherein the length of the measurement gaps of the measurement gap configuration is smaller than half the round-trip time between the network node and the wireless communication device.

32. The arrangement of claim 22, wherein the arrangement is comprised in a network node of a cellular communication system.

33. An arrangement for a wireless communication device configured to communicate with a network node of a cellular communication system according to an automatic repeat request (ARQ) protocol having a requirement that a length of time between reception of an ARQ packet and transmission of an associated response message is smaller than a predefined maximum response time, wherein during intervals of time denoted measurement gaps, the wireless communication device is permitted to momentarily stop communicating with a serving cell in order to perform measurements on its radio environment, the arrangement comprising:
   an interface, wherein the interface is configured to supply control signals to a transceiver; and
   a controller adapted to:
   cause transmission of at least one measurement gap adaptation signal to the network node; and
   use a measurement gap configuration to perform measurements, wherein an indication of the measurement gap configuration is received from the network node, wherein the measurement gap configuration is determined by the network node based on the measurement gap adaptation signal, and wherein measurement gaps of the measurement gap configuration have a length smaller than the maximum response time,
   wherein the controller is adapted to perform the measurements by:
   determining a number of separating time units separating each of two or more synchronization signals received in different measurement gaps of the measurement gap configuration from a subsequently received synchronization signal;
   for each of a plurality of hypotheses regarding a time unit number of a first received of the received synchronization signals and regarding a synchronization signal series:
      correlating the received synchronization signals with corresponding synchronization signal sequences, wherein the corresponding synchronization signal sequences are selected according to the hypothesis, the determined number of separating time units, and the synchronization signal series; and
      determining the synchronization signal series having maximum correlation among the hypotheses as a detected synchronization signal series.

34. The arrangement of claim 33, wherein the at least one measurement gap adaptation signal comprises an indication of a capability of the wireless communication device to operate according to one or more measurement gap configurations with measurement gap lengths smaller than the maximum response time.

35. The arrangement of claim 33, wherein the at least one measurement gap adaptation signal comprises a request by the wireless communication device to be configured to operate according to one or more measurement gap configurations with measurement gap lengths smaller than the maximum response time.

36. The arrangement of claim 33, wherein the measurement gap configuration specifies a periodicity of the measurement gaps.

37. The arrangement of claim 36, wherein the periodicity of the measurement gaps is larger than a maximum time between transmission of the ARQ packet and reception of the associated response message.

38. The arrangement of claim 36, wherein a number of time units equaling the periodicity of the measurement gaps is different from a multiple of a number of time units between occurrences of synchronization signal transmissions of cellular communication system.

39. The arrangement of claim 38, wherein the number of time units equaling the periodicity of the measurement gaps is an odd number.

40. The arrangement of claim 33, wherein the controller is adapted to perform the measurements by combining measurements of two or more measurement gaps of the measurement gap configuration into a single measurement result.

41. The arrangement of claim 33, further comprising:
   a transmitter adapted to transmit the at least one measurement gap adaptation signal to the network node; and
   a receiver adapted to receive the indication of the measurement gap configuration from the network node.

42. The arrangement of claim 33, wherein the maximum response time is defined as a minimum of:
   an uplink maximum response time imposed on the network node according to the ARQ protocol; and
   a downlink maximum response time imposed on the wireless communication device according to the ARQ protocol.

43. The arrangement of claim 33, wherein the length of the measurement gaps of the measurement gap configuration is also smaller than a round-trip time between the network node and the wireless communication device.

44. The arrangement of claim 43, wherein the length of the measurement gaps of the measurement gap configuration is smaller than half the round-trip time between the network node and the wireless communication device.

45. The arrangement according to claim 33, wherein the arrangement is comprised in a wireless communication.

* * * * *